US009481212B2

(12) United States Patent
Takahashi

(10) Patent No.: US 9,481,212 B2
(45) Date of Patent: Nov. 1, 2016

(54) PNEUMATIC TIRE

(71) Applicant: BRIDGESTONE CORPORATION, Chuo-ku, Tokyo (JP)

(72) Inventor: Tatsuo Takahashi, Higashimurayama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 197 days.

(21) Appl. No.: 14/372,791

(22) PCT Filed: Jan. 10, 2013

(86) PCT No.: PCT/JP2013/000052
§ 371 (c)(1),
(2) Date: Jul. 17, 2014

(87) PCT Pub. No.: WO2013/108594
PCT Pub. Date: Jul. 25, 2013

(65) Prior Publication Data
US 2015/0151583 A1 Jun. 4, 2015

(30) Foreign Application Priority Data

Jan. 18, 2012 (JP) ................................. 2012-008460

(51) Int. Cl.
*B60C 11/11* (2006.01)
*B60C 11/03* (2006.01)
*B60C 11/04* (2006.01)

(52) U.S. Cl.
CPC ................ *B60C 11/04* (2013.01); *B60C 11/11* (2013.01); *B60C 2011/0346* (2013.04); *B60C 2011/0348* (2013.04); *B60C 2011/1213* (2013.04)

(58) Field of Classification Search
CPC ............... B60C 11/11; B60C 11/0346; B60C 11/0348; B60C 2200/06; B60C 11/0306; B60C 2011/0372; B60C 2011/0388; B60C 11/04; B60C 11/03
USPC .................................. 152/209.2, 209.27, 902
See application file for complete search history.

(56) References Cited

U.S. PATENT DOCUMENTS

2010/0180997 A1 7/2010 Shimizu
2011/0100520 A1* 5/2011 Shimizu ............. B60C 11/0306
152/209.18

(Continued)

FOREIGN PATENT DOCUMENTS

CN 102159409 A 8/2011
CN 102264561 A 11/2011

(Continued)

OTHER PUBLICATIONS

Communication dated Jul. 21, 2015 from the European Patent Office issued in corresponding application No. 13738284.2.

(Continued)

*Primary Examiner* — Eric Hug
(74) *Attorney, Agent, or Firm* — Sughrue Mion, PLLC

(57) ABSTRACT

On the tread surface, land portions are defined by a pair of circumferential main grooves and divided, by circumferential narrow grooves 3 and multiple lateral grooves 4 connecting between the circumferential main groove and the circumferential narrow groove or between the circumferential narrow grooves, into block rows L each of which including polygonal blocks arranged in a tire circumferential direction, wherein a block arrangement having the polygonal blocks 5 arranged in a line-symmetric manner with respect to the tire equator as an axis of symmetry includes side regions $R_1$, $R_2$ facing each other across the tire equator C and displaced from each other in the tire circumferential direction by a phase difference of 0.2 to 0.4 times of a repetition pitch of a pattern of the block row.

9 Claims, 8 Drawing Sheets

(56) References Cited

U.S. PATENT DOCUMENTS

| | | | | |
|---|---|---|---|---|
| 2011/0220261 A1* | 9/2011 | Matsuzawa | ......... | B60C 11/0306 152/209.23 |
| 2011/0296921 A1 | 12/2011 | Sakuraba | | |
| 2012/0216931 A1* | 8/2012 | Shiono | ................ | B60C 11/0306 152/209.18 |

FOREIGN PATENT DOCUMENTS

| | | | |
|---|---|---|---|
| EP | 0469816 | * | 2/1992 |
| EP | 2371583 A1 | | 10/2011 |
| FR | 2452391 | * | 10/1980 |
| GB | 520231 | * | 4/1940 |
| JP | 2001191739 A | | 7/2001 |
| JP | 2002528333 A | | 9/2002 |
| JP | 2007-168572 A | | 7/2007 |
| JP | 2009-190558 A | | 8/2009 |
| JP | 2011-79458 A | | 4/2011 |
| JP | 2011143901 A | | 7/2011 |
| JP | 2011-183927 A | | 9/2011 |
| JP | 2011-245957 A | | 12/2011 |
| JP | 2012-1120 A | | 1/2012 |
| WO | 2008/146851 A1 | | 12/2008 |
| WO | 2010/032737 A1 | | 3/2010 |
| WO | 2011055681 A1 | | 5/2011 |
| WO | WO 2011/055681 | * | 5/2011 |

OTHER PUBLICATIONS

Communication dated Dec. 10, 2015, from the State Intellectual Property Office of People's Republic of China in counterpart application No. 201380005652.8.

International Search Report for PCT/JP2013/000052 dated Mar. 26, 2013.

Communication dated Aug. 4, 2015 from the Japanese Patent Office in counterpart application No. 2012-008460.

* cited by examiner

FIG. 6
(a)
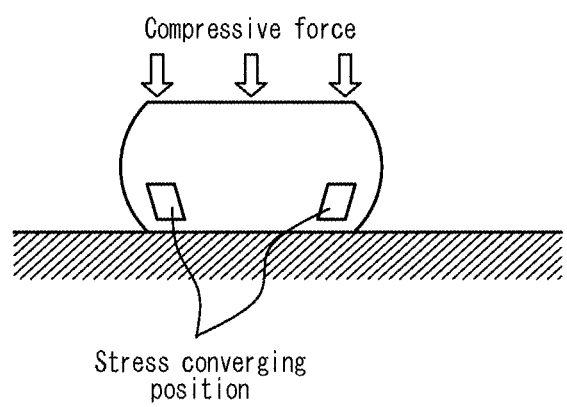
(b)
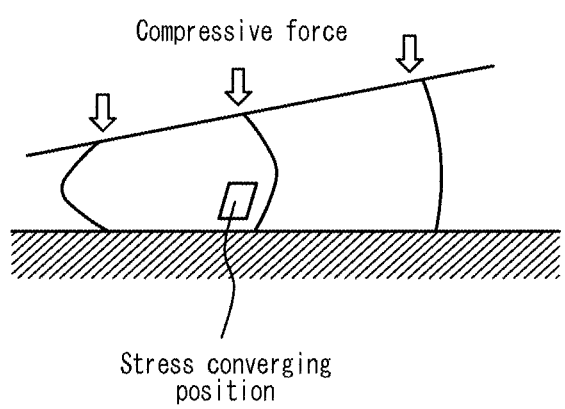

PNEUMATIC TIRE

CROSS REFERENCE TO RELATED APPLICATIONS

This application is a National Stage of International Application No. PCT/JP2013/000052 filed Jan. 10, 2013, claiming priority based on Japanese Patent Application No. 2012-008460, filed Jan. 18, 2012, the contents of all of which are incorporated herein by reference in their entirety.

TECHNICAL FIELD

The present invention relates to a pneumatic tire having, on a tread surface, a land portion defined by a pair of circumferential main grooves extending in a zigzag manner along a tire equator on either sides thereof, the land portion being divided, by at least four circumferential narrow grooves extending in the zigzag manner along the tire equator and multiple lateral grooves communicating between the circumferential main groove and the circumferential narrow groove or between the circumferential narrow grooves, into at least five block rows each of which including polygonal blocks with at least five corners arranged in a tire circumferential direction, and in particular, the present invention relates to a pneumatic tire that generates less noise.

BACKGROUND ART

A heavy duty tire used for a truck and a bus, due to its design having a large flatness ratio and high rigidity to be able to support considerable weight, is known to generate shear deformation in a tire circumferential direction caused by a displacement difference that occurs between a belt portion and a tread surface and, as a result, to easily wear a block caused by a sliding phenomenon of the block on a road surface.

As such, Patent Document 1 suggests, from the viewpoint of that, as a result of a decrease in an area of the tread surface to contact with the road surface due to an increase in belt stiffness, circumferential shear force at the time of kick-out of the tread increases excessively and leads to deterioration of wear resistance, a devisal of a shape and an arrangement of the blocks so as to, during running, utilize a reaction to the increase in the shear deformation of the blocks having finished kick-out and generate driving force at the time of kick-in as well. In particular, Patent Document 1 suggests, as illustrated in FIG. 9, a tire having, on the tread surface, multiple block land portions defined by a plurality of circumferential grooves and a plurality of lateral grooves communicating between the plurality of circumferential grooves, wherein, in order that the block land portions may receive the reaction from proximate block land portions, the block land portions are formed in a substantially hexagonal shape and closely and densely arranged.

RELATED ART DOCUMENT

Patent Document

Patent Document 1: WO2008/146851

SUMMARY OF INVENTION

Technical Problem

However, there has been a problem that the tire having a tread pattern in which the polygonal blocks are closely and densely arranged as described above, when mounted on a vehicle and running on the road surface, generates a noise, especially a groan sound noise. Therefore, a solution for such a problem of the design has been required.

Accordingly, an object of the present invention is to propose a pneumatic tire having, on the tread surface, polygonal blocks closely and densely arranged and capable of reducing the noise in a high dimension.

Solution to Problem

Generally, a tread pattern is formed of a repetitive basal design and, due to repetition of a pitch noise generated at predetermined intervals when the block contacts with the road surface, a noise called a pattern noise is generated. Accordingly, when a plurality of blocks provided on the tread surface are arranged side by side (located in the same phase) in a tread width direction, the blocks generate the pitch noise at the same time. As a result, the noise is amplified, leading to an increase in the noise.

As measures to reduce this noise, it may be considered to delay the timings generating the pitch noise, that is, to delay timings for some blocks in the same phase to contact with the ground, thereby providing a phase difference in the tread width direction. In this regard, although Patent Document 1 has a block pattern as illustrated in FIG. 9 in which block rows are alternately displaced by a half pitch in the tire circumferential direction so as to change the phase, a noise reduction by such a design has been still insufficient.

As such, the inventor diligently studied seeking a method to further reduce the noise of the pneumatic tire having polygonal blocks closely and densely arranged as described above. As a result, the inventor focused on that, although in the block pattern of Patent Document 1 the phases of adjacent blocks are varied, the blocks in alternate rows may locate in the same phase due to the dense arrangement of the blocks and thus amplification of the pitch sound is inevitable after all. Thereby, the inventor has found out that there is room for an improvement in this regard. That is, the inventor has found out that, by adopting a novel idea to displace the blocks in a tread half-width region, as opposed to each adjacent block, as a unit in the tire circumferential direction with a tire equator as a boundary, a dense geometric block pattern may maintain its arrangement while having an effective phase difference of the blocks over the entire tread. Then, as a result of further studies based on the above finding, the inventor has also found out that, in displacement of the tread half-width regions in the tire circumferential direction, there is a specific range of the phase difference that may significantly reduce the noise. Thus, the inventor accomplished the present invention.

That is, a summary of the present invention is as follows.

(1) A pneumatic tire having, on a tread surface, a land portion defined by a pair of circumferential main grooves extending in a zig-zag manner along a tire equator on either side thereof, the land portion being divided, by at least four circumferential narrow grooves extending in the zig-zag manner along the tire equator and multiple lateral grooves communicating between the circumferential main groove and the circumferential narrow groove or between the circumferential narrow grooves, into at least five block rows each of which including polygonal blocks with at least five corners arranged in a tire circumferential direction, wherein
a block arrangement having the polygonal blocks arranged in a line-symmetric manner with respect to the tire equator as an axis of symmetry includes side regions facing each other across the tire equator and displaced from each other in the tire circumferential direction by a phase difference of 0.2 to 0.4 times of a repetition pitch of a pattern of the block row.

(2) The pneumatic tire according to the above (1), wherein the block arrangement includes the side regions displaced from each other in the tire circumferential direction by 0.24 to 0.32 times of the repetition pitch of the pattern of the block row.

(3) The pneumatic tire according to the above (1) or (2), wherein any one of the block rows is located across the tire equator.

(4) The pneumatic tire according to the above (3), wherein the polygonal blocks constituting the block row located across the tire equator, according to a phase difference between the side regions facing each other across the tire equator, have a shape displaced and stretched in the tire circumferential direction.

(5) The pneumatic tire according to any one of the above (1) to (4), wherein the polygonal blocks constituting each of the block rows adjacent to one another in a tire width direction across the tire circumferential narrow groove are displaced from one another in the tire circumferential direction.

(6) The pneumatic tire according to any one of the above (1) to (5), wherein a groove width of the circumferential narrow groove is smaller than a groove width of the lateral groove.

(7) The pneumatic tire according to the above (6), wherein the groove width of the circumferential narrow groove is 0.5 to 3.0 mm.

(8) The pneumatic tire according to any one of the above (1) to (7), wherein a length of the polygonal block in the tire width direction increases from either tire circumferential end of the polygonal block to a center of the polygonal block.

(9) The pneumatic tire according to any one of the above (1) to (8), wherein the polygonal block is provided with a sipe communicating between circumferential grooves adjacent to the polygonal block in the tire width direction.

(10) The pneumatic tire according to the above (9), wherein the sipe is formed in a crank shape extending in the tire width direction.

(11) The pneumatic tire according to any one of the above (1) to (10), wherein the polygonal block is hexagonal.

Effect of the Invention

According to the present invention, a pneumatic tire having, on the tread surface, polygonal blocks closely and densely arranged and capable of reducing the noise in a high dimension may be provided.

BRIEF DESCRIPTION OF DRAWINGS

FIG. 6(a) is a diagram illustrating the polygonal block in contact with the ground when pressed horizontally with respect to a road surface, and (b) is a diagram illustrating the polygonal block in contact with the ground when pressed obliquely with respect to the road surface;

DESCRIPTION OF EMBODIMENT

Figure 1:
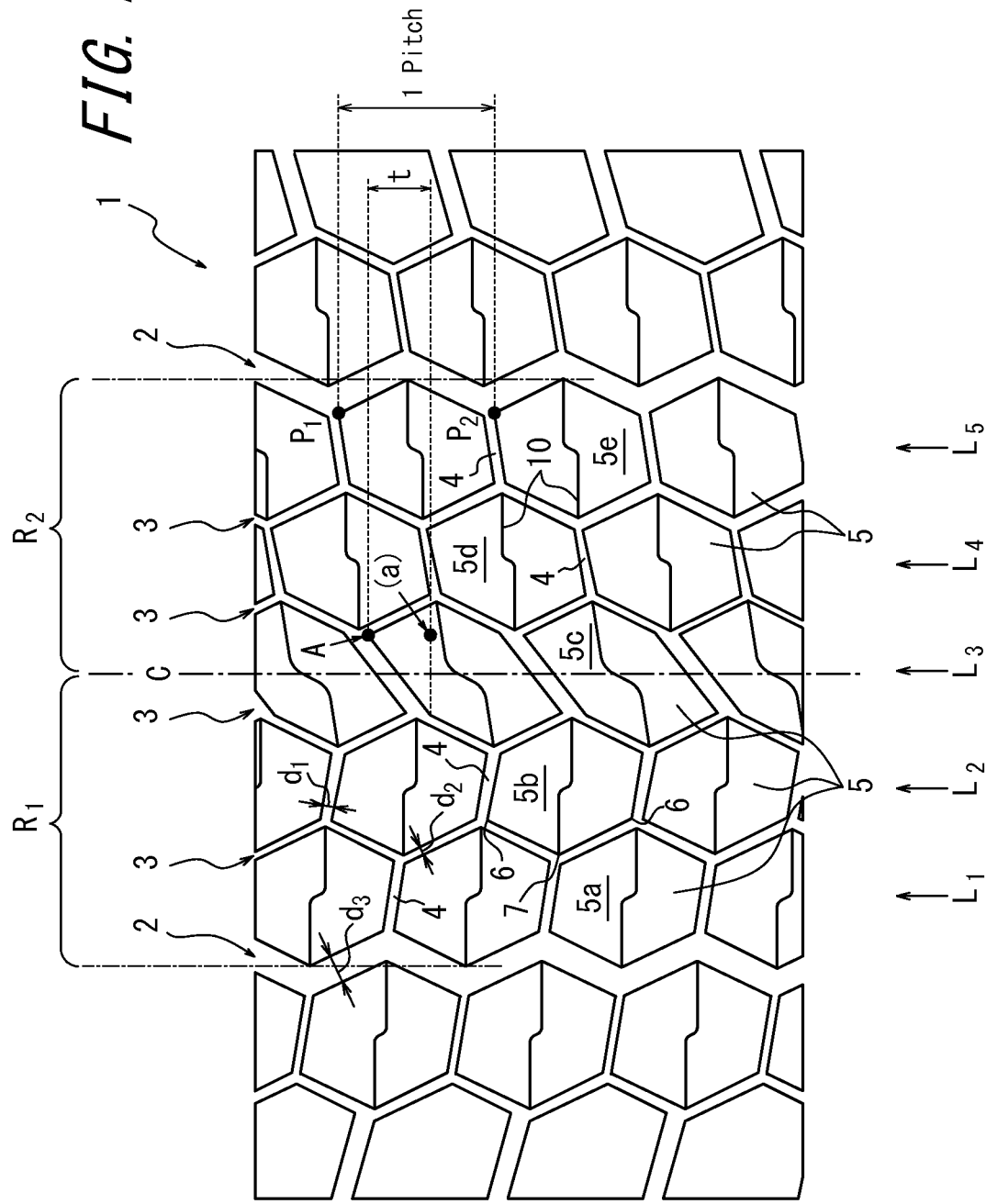
FIG. 1 is a development view of a portion of a tread surface of a pneumatic tire according to the present invention.
Figure 2:
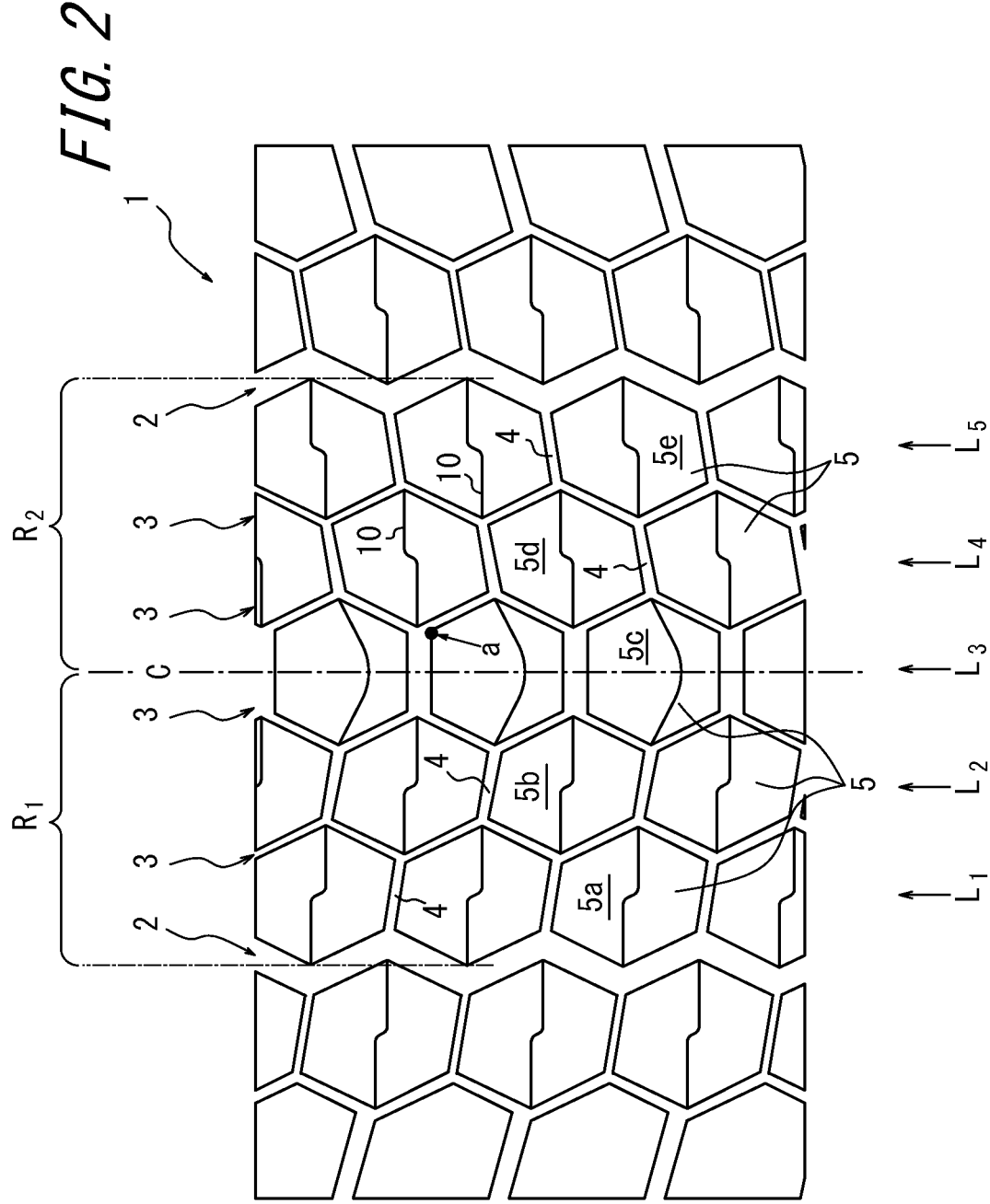
FIG. 2 is a diagram illustrating a block arrangement in which side regions, before displacement thereof, are line symmetric with respect to a tire equator as an axis of symmetry.
Figure 3:
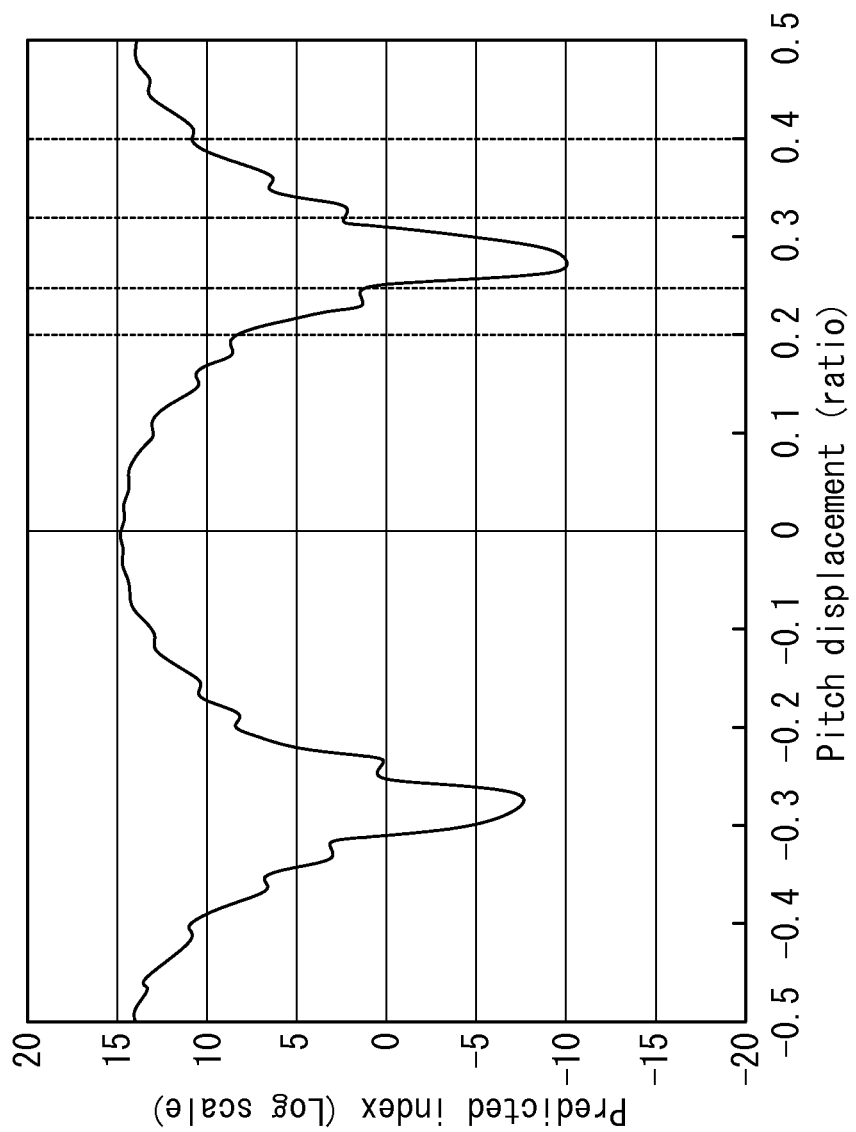
FIG. 3 is a graph showing a relation between a displacement amount (ratio) of the side regions and a noise level.
Figure 4:
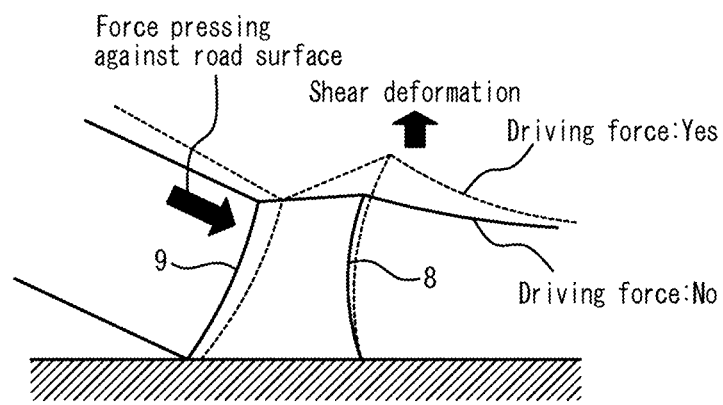
FIG. 4 is a diagram illustrating block deformation of polygonal blocks adjacent to one another upon application of driving force.
Figure 5:
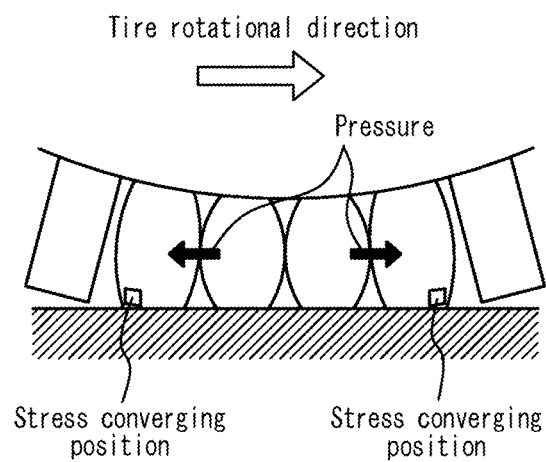
FIG. 5 is a diagram illustrating the block deformation of the polygonal blocks that are adjacent to one another in a tire circumferential direction and closely arranged.
Figure 7:
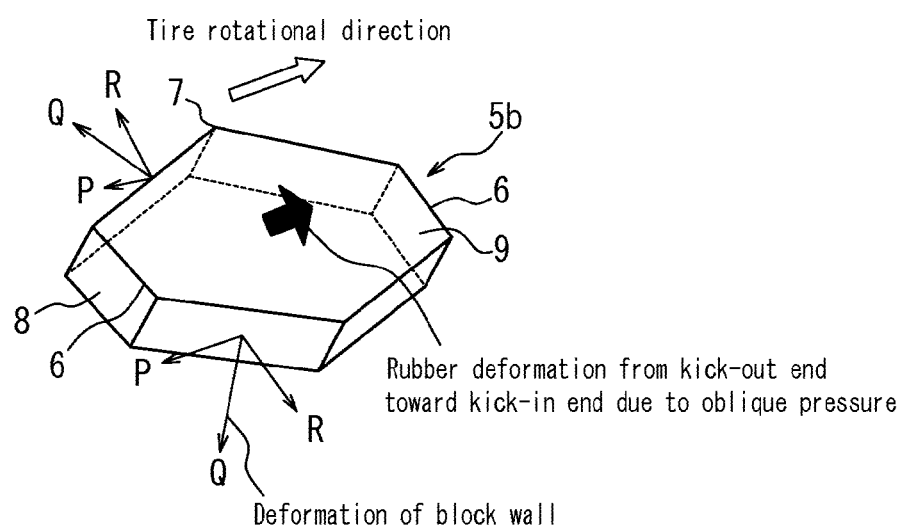
FIG. 7 is a perspective view of the polygonal block indicating a direction of force when the polygonal block is pressed obliquely with respect to the road surface.
Figure 8:
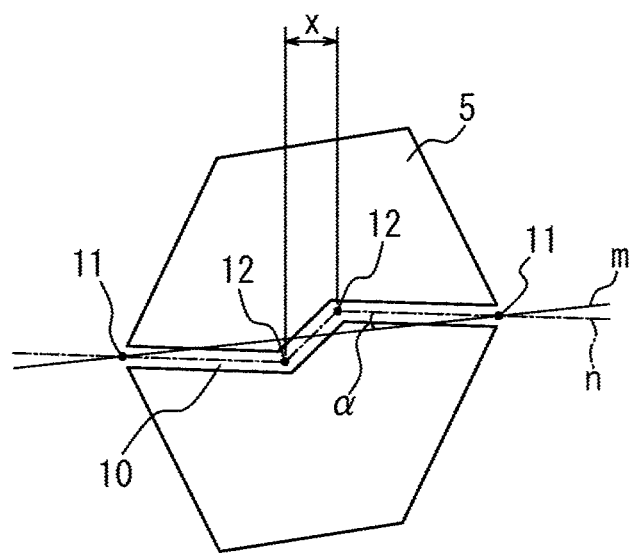
FIG. 8 is an enlarged view of the polygonal block illustrated in FIG. 1.

Hereinafter, a pneumatic tire according to the present invention will be described in detail with reference to the accompanying drawings. FIG. 1 is a development view of a portion of a tread surface of the pneumatic tire according to the present invention. FIG. 2 is a diagram illustrating a block arrangement in which side regions, before displacement thereof, are line symmetric with respect to a tire equator as an axis of symmetry. FIG. 3 is a graph showing a relation between a displacement amount (ratio) of the side regions and a noise level. FIG. 4 is a diagram illustrating block deformation of polygonal blocks adjacent to one another upon application of driving force. FIG. 5 is a diagram illustrating the block deformation of the polygonal blocks that are adjacent to one another in a tire circumferential direction and closely arranged. FIG. 6(a) is a diagram illustrating the polygonal block in contact with the ground when pressed horizontally with respect to a road surface. FIG. 6(b) is a diagram illustrating the polygonal block in contact with the ground when pressed obliquely with respect to the road surface. FIG. 7 is a perspective view of the polygonal block indicating a direction of force when the polygonal block is pressed obliquely with respect to the road surface. FIG. 8 is an enlarged view of the polygonal block illustrated in FIG. 1.

FIG. 1 illustrates a developed view of a portion of a tread surface 1 of the pneumatic tire according to the present invention (hereinafter, referred to as a "tire").

On the tread surface 1, a land portion defined by a pair of circumferential main grooves 2,2 extending in a zig-zag manner along a tire equator C on either side of the tire equator C is divided into at least five block rows L, here five block rows $L_1$ to $L_5$, by at least four circumferential narrow grooves extending in the zig-zag manner along the tire equator C, here which are four circumferential narrow grooves 3, and also by multiple lateral grooves 4 communicating between the circumferential main groove 2 and a circumferential narrow groove 3 or between the circumferential narrow grooves 3, 3. The block 5 has a polygonal shape with at least five corners. In an illustrated example, the block 5 is a hexagonal block.

On the tread surface 1 of the present invention, as described above, a plurality of polygonal blocks 5 are closely and densely arranged between the circumferential main grooves 2, 2.

According to the present invention, it is important to provide, in a block arrangement having the polygonal blocks 5 described above arranged in a line-symmetric manner with the tire equator C as the axis of symmetry and closely and densely arranged, a phase difference of 0.2 to 0.4 times of a repetition pitch of a pattern of the block row L between the side regions facing each other across the tire equator C.

In more detail, the block arrangement having the polygonal blocks 5 arranged in the line-symmetric manner with the tire equator C as the axis of symmetry means a block arrangement in which, as illustrated in FIG. 2, polygonal blocks 5a, 5b disposed in a side region $R_1$ on the left-hand side of the tire equator C in the figure and polygonal blocks 5d, 5e disposed in a side region $R_2$ on the right-hand side of the tire equator C in the figure are line symmetric with respect to the tire equator C. Here, the side region $R_1$ represents a region extending in a tire width direction from the tire equator C to a tire width direction outermost point of the block row $L_1$, and the side region $R_2$ represents a region extending in the tire width direction from the tire equator C to a tire width direction outermost point of the block row $L_5$. The present invention is characterized in displacing one of the side regions $R_1$ and $R_2$ from the other in the tire circumferential direction by a displacement amount of 0.2 to 0.4 times of one pitch. That is, in the illustrated example, the entire side region $R_2$ in FIG. 2 illustrating the block arrangement before the displacement is displaced from the side region $R_1$ in the tire circumferential direction (in an upward direction in the figure), such that a vertex a of a polygonal block 5c in FIG. 2 corresponds to a vertex A of the polygonal block 5c in FIG. 1 illustrating the block arrangement after the displacement. At this time, a distance t in the tire circumferential direction between the vertex a and the vertex A is 0.2 to 0.4 times of one pitch.

Note that the block row L is formed by repetition of a block pattern having the polygonal block 5 arranged in the tire circumferential direction. According to the present invention, the "one pitch" refers to a length, in the tire circumferential direction, of a repetition unit of the block pattern in the block rows other than the block row located across the tire equator C. That is, as illustrated in FIG. 1, the "one pitch" refers to a length, in the tire circumferential direction, of the block row other than the block row $L_3$ located across the tire equator C, i.e., here, a length, in the tire circumferential direction, from an end $P_1$ of the polygonal block 5 in the block row $L_5$ to an end $P_2$ at a corresponding position of another polygonal block 5 adjacent to the above polygonal block 5.

As described above, the displacement of the side region as a unit in the tire circumferential direction with respect to the tire equator C as a boundary, allows maintaining, in each of the side regions, the shape of a plurality of polygonal blocks 5 and a geometric block arrangement having the polygonal blocks 5 closely and densely arranged and, simultaneously, providing a phase difference between a plurality of block rows L. That is, at the stage of FIG. 2 before displacement of the region in the tire circumferential direction, the polygonal blocks 5a, 5e are located at corresponding positions in the tire width direction and the polygonal blocks 5b, 5d are located at corresponding positions in the tire width direction. On the other hand, in FIG. 1 illustrating the block arrangement after the displacement in the tire circumferential direction, the polygonal blocks 5a, 5b, 5d, and 5e are arranged such that none of block ends thereof becomes collinear in the tire width direction. In other words, those block ends are positioned in such a manner that all of the polygonal blocks 5a to 5e between the circumferential main grooves 2, 2 contact with the road surface at different timings. Therefore, according to a design of the present invention that provides the phase difference by displacement of the side region in the tire circumferential direction, various functions of the block arrangement having the polygonal blocks 5 closely and densely arranged may be maintained and, simultaneously, the polygonal blocks 5 in each of the block rows L may contact with the ground at different timings, thereby reducing a pattern noise.

As a result of diligent studies based on the idea described above, the inventor has found out that, in addition to the simple displacement of the side region in the tire circumferential direction, displacement of the side region within a specific range as illustrated in FIG. 3, in particular, 0.2 to 0.4 times of the pitch of the repetition of the block pattern in the block row L allows an advantageous noise reduction. The displacement amount within such a range makes each of a plurality of kick-in end portions of the polygonal blocks 5 contact with the ground surface at different timings, thereby reducing the pattern noise. In the block row L, since lugs and sipes are arranged alternately in the block row L, each block generates the noise at intervals of 0.5 pitch. The displacement amount needs to deviate from the 0.5 pitch, that is, within the range of 0.2 to 0.4 times of the pitch.

Note that the graph illustrated in FIG. 3 plots amounts of changes in the noise of a component having a second peak in a frequency analysis (a secondary component of a frequency at a speed of 70 km/h) when the side regions are displaced from each other in the tire circumferential direction. In the graph of FIG. 3, a horizontal axis represents the displacement amount (mm) in the tire circumferential direction with respect to a length (mm) of the one pitch in the tire circumferential direction (a pitch displacement ratio), and a vertical axis represents a value, as an index, obtained by counting chronological timings at which the kick-in end portions of the blocks contact with the ground surface and predicting data thereof by frequency resolution.

As a result of a frequency characteristics analysis, it was found out that a primary component is present around 290 Hz (tire rotation number×number of pitches) and the secondary component is present around 580 Hz (tire rotation number×number of pitches×2) and also that the secondary component reaches a peak. Therefore, it was aimed to suppress the secondary component. The reason for the secondary component to reach the peak is considered that, as described above, in one pitch the block includes the lug and the sipe and the noise increases at every 0.5 pitch, that is, the secondary component becomes large. A coefficient 2 in the formula, tire rotation number×number of pitches×2, means that one pitch is divided into two, i.e., ½ (0.5) pitch.

Note that, further preferably, the side regions are displaced from each other in the tire circumferential direction to have the phase difference of 0.24 to 0.32 times of the repetition pitch of the pattern of the block row L. As can be seen from FIG. 3, the displacement between the side regions facing each other across the tire equator C in the tire circumferential direction may more significantly reduce the noise caused by the pattern noise.

According to the pneumatic tire of the present invention, also, any one of the block rows L is preferably located across the tire equator C. Referring to the example illustrated in FIG. 1, the block row $L_3$ including the polygonal block 5c is located across the tire equator C. During running, a heaviest load is applied to the equator C. Therefore, an arrangement allowing continual presence of the blocks on the tire equator C may secure rigidity of the tire.

At this time, the polygonal blocks 5 constituting the block row $L_3$ located across the tire equator C, according to the phase difference described above between the side regions facing each other across the tire equator C, preferably have shapes displaced and stretched in the tire circumferential direction.

As illustrated in FIG. 1, the side regions facing each other across the tire equator C are displaced from each other in the tire circumferential direction in such a manner that the polygonal blocks in the block row $L_3$ located across the tire equator C extend in the tire circumferential direction. Thereby, the polygonal blocks other than those on the tire equator C, i.e., the polygonal blocks constituting the block rows $L_1$, $L_2$, $L_4$ $L_5$ may be maintained in the shapes the same as those before the displacement in the tire circumferential direction. Accordingly, while the various functions of the polygonal blocks in the block arrangement before the displacement of the side regions in the tire circumferential direction are maintained, the noise may be advantageously reduced.

According to the pneumatic tire of the present invention, further, it is preferable that the polygonal blocks 5 constituting the block rows L adjacent to one another in a tire width direction across the tire circumferential narrow groove 3 are displaced from each other in the tire circumferential direction, and also that a groove width $d_2$ of the circumferential narrow groove formed between the polygonal blocks 5 adjacent to one another in the tire width direction is smaller than a groove width $d_1$ of a lateral groove 4 formed between the polygonal blocks 5 adjacent to one another in the tire circumferential direction.

Here, in a heavy duty tire, as a result of reduction in a ground contact area of the tread surface due to an increase in belt rigidity, circumferential shear force at the time of kick-out of the tread increases excessively. That is, when the driving force is applied, the circumferential shear force at any position of the block being in contact with the road surface (force in a driving direction acting on a ground contact surface of the tire) at the time of kick-in has almost no difference from that with no driving force applied but sharply increases in a monotonous manner to the time of kick-out and becomes great at the time of kick-out. As a result, the block leans excessively, generating sliding wear and possibly deteriorating wear resistance. Therefore, generation of the circumferential shear force from the time of kick-in when there is almost no change therein so as to reduce the circumferential shear force at the time of kick-out should suppress an extreme increase in the circumferential shear force at the time of kick-out.

As such, it is preferable that, the above design is adopted in such a manner that, as illustrated in FIG. 4, reaction force of lift generated upon application of the driving force due to an increase in shear deformation of the polygonal block 5 that has finished kick-in is utilized so as to increase deformation of a next polygonal block 5 pressed against the road, thereby efficiently generating the driving force at the time of kick-in. In order to cause this phenomenon, it is required that the polygonal blocks 5 constituting the block rows L adjacent to one another in the tire width direction be displaced from one another in the tire circumferential direction, while the polygonal blocks 5 are closely and densely arranged with a short distance therebetween. However, since rubber forming the polygonal block 5 expands and deforms at the time of ground contact, when the polygonal blocks 5 are too close to one another in the tire circumferential direction, the polygonal blocks 5 contact with each other at the time of ground contact, causing force in the same direction as the driving force at the time of kick-out. As a result, an effect of generation of the driving force at the time of kick-in by the above phenomenon is reduced. As such, the groove width $d_2$ of the circumferential narrow groove is set to be smaller than the groove width $d_1$ of the lateral groove 4. Thereby, an influence of the contact between the polygonal blocks 5 in the tire circumferential direction may be eliminated and, also, an action between the polygonal blocks 5 described above may be effectively utilized.

Note that the groove width $d_1$ of the lateral groove 4 refers to a normal distance of a groove wall between the polygonal blocks 5 adjacent to one another in the tire circumferential direction, and the groove width $d_2$ of the circumferential narrow groove refers to a normal distance of the groove wall between the polygonal blocks 5 adjacent to one another in the tire width direction.

As described above, the reduction in the increasing amount of the circumferential shear force between the time of kick-in and the time of kick-out may suppress excessive leaning of the polygonal blocks 5, thereby improving the wear resistance. Further, the suppression of the deformation of the polygonal block 5 allows reduction in rolling resistance and improvement in steering stability.

Note that the groove width $d_2$ of the circumferential narrow groove is preferably 0.5 to 3.0 mm.

The rubber of the tire forming the polygonal block 5, at the time of ground contact, bulges and deforms in the tire width direction and also in the tire circumferential direction. However, when the polygonal blocks 5 adjacent to one another come into contact with one another, the bulging is suppressed and, as a result, the deformation of the polygonal blocks 5 is also suppressed. Accordingly, when the groove width $d_2$ of the circumferential narrow groove is equal to or less than 3.0 mm, the polygonal blocks 5 adjacent to one another in the tire width direction come into contact with one another at the time of ground contact. Thereby, the deformation of the polygonal blocks 5 may be suppressed and further reduction in the rolling resistance as well as further improvement in the steering stability may be achieved. The reason to have the groove with $d_2$ at least 0.5 mm is that wet turning performance, i.e., water drainage performance becomes deteriorated when the groove is completely closed.

On the other hand, a groove width d3 of the circumferential main groove 2 provided on the tread surface 1 is preferably wider than the groove width $d_2$ of the circumferential narrow groove and has an enough width to be able to prevent the groove from closing at the time of ground contact.

Also, a length of the polygonal block 5 in the tire width direction preferably increases from either tire circumferential end to a center thereof. In detail, referring to the polygonal block 5b in FIG. 1, the length of the polygonal block 5b in tire width direction preferably increases from tire circumferential ends 6, 6 of the polygonal blocks 5b to a center 7 of the polygonal block 5b.

When the polygonal block 5 is horizontally pressed against the road surface at the time of ground contact, stress caused by incompressibility of the rubber is converged at the kick-in end portion and a kick-out end portion of the polygonal block 5. However, at the time of kick-out when tread wearing occurs due to slipping of the tread surface, since the tread surface is obliquely pressed against the road surface by a belt, the stress caused by the incompressibility of the rubber applies a load to the center of the polygonal block 5 as illustrated in FIG. 6(b). Especially, in the heavy duty tire that has a large flatness ratio and high belt rigidity, since the tread surface is obliquely pressed against the road surface in a stronger manner, the stress caused by the incompressibility of the rubber applies a greater load to the center of the polygonal block 5. Force caused along with compression deformation thus generated is applied in the same direction as the running direction of the vehicle and increased by the driving force, leading to an increase in the sliding wear.

As such, the above design, when the polygonal block 5b obliquely contacts with the ground surface, allows convergence of the compression stress in the center of the polygonal block 5b as illustrated in FIG. 6(b). Therefore, when force is generated to deform the rubber in the center of the polygonal block 5b from the kick-out end portion to the kick-in end portion, force Q, as illustrated in FIG. 7, is generated to bulge a wall of the polygonal block 5b that is inclined with respect to the tire circumferential direction on a side of a kick-out end 8 of the polygonal block 5b. Then, components R of the force Q are generated from a left-side wall and a right-side wall of the polygonal block 5b in directions opposite to each other and cancel out each other within the polygonal block 5b. On the other hand, a component P resists the force to deform the rubber in the center of the polygonal block 5b to deform from the kick-out end 8 toward a kick-in end 9. As a result, excessive deformation of the polygonal block 5b is suppressed and the sliding wear of the polygonal block 5b may be suppressed.

Also, the polygonal block 5 is preferably provided with a sipe 10-communicating, in the tire width direction, between the circumferential grooves adjacent to the polygonal block 5. Here, the sipe is a groove that, when a tire has a prescribed internal pressure and a prescribed load applied thereto, closes at the time of ground contact and opens at the time of kick-in and also at the time of kick-out.

As described above, further providing the kick-out end to the polygonal block 5 allows overall improvement in grip force of the polygonal block 5 and, as a result, torque from an engine may be efficiently converted into the driving force. Also, providing the sipe 10 ensures the water drainage performance.

Further, the sipe 10 described above preferably has a crank shape.

Since the sipe 10 opens at the time of kick-in and at the time of kick-out, the polygonal block 5 deforms, possibly causing energy loss and deteriorating block rigidity. However, when the sipe 10 is formed in the crank shape and thus allows portions of the polygonal block 5 divided by the sipe 10 to mesh with each other, the sipe 10 may be suppressed from opening. Thereby, the effect of the sipe described above may be maintained and, simultaneously, the reduction in the rolling resistance and the improvement in the steering resistance may be achieved.

Also, providing the sipe 10 increases the number of grooves in the polygonal block 5, thereby causing a ground contact noise when the grooves contact with the ground. Accordingly, when the sipe 10 is formed in the crack shape as described above, the entire sipe 10 may contact with the ground at various timings unlike a sipe formed in a straight line in the tire width direction, leading to suppression of generation of the noise.

Also, the polygonal block 5 is preferably hexagonal. In this case, as illustrated in FIG. 8, an acute angle α between a straight line m (a solid line) connecting sipe width midpoints 11, 11 of open ends of the sipe 10 and a line n (a broken line) indicating a center of the sipe is preferably 5 to 25 degrees. When the acute angle α is smaller than 5 degrees, the effect of meshing of the divided portions of the polygonal block 5 is reduced. On the other hand, when the acute angle α exceeds 25 degrees, an angle with respect to the tire width direction is so large that stiffness is locally reduced and the polygonal block 5 could be torn off.

Further, on the line n indicating the center of the sipe, a tire width direction distance x between two tire width direction outermost inflection points 12, 12 of the sipe is preferably at most ½ of a maximum length of the polygonal block 5 in the tire width direction. Here, the maximum length of the polygonal block 5 in the tire width direction refers to a distance between tire width direction outermost points of the polygonal block 5. When the tire width direction distance x of the sipe 10 is too long, the divided portions of the polygonal block 5 weakly meshes with each other, possibly opening the sipe widely.

Also, a circumferential width of the polygonal block 5 is preferably longer than a lateral width thereof. When the circumferential width of the polygonal block 5 is longer, a pitch length is longer. The longer the pitch length is, the number of pitches reduces. As a result, the pattern noise caused by the polygonal block 5 is reduced.

Note that, although in the illustrated example, the blocks similar to the polygonal block 5 are arranged outside of the circumferential main grooves 2, 2 with respect to the width direction, a design outside of the circumferential main grooves 2, 2 with respect to the width direction is not necessarily limited thereto.

Further, the above designs merely describe a part of the embodiment of the present invention, and it is appreciated that these designs may be combined or modified in various manners without departing from the spirit of the present invention. For example, although FIG. 1 illustrates five block rows L, six or more block rows L may be provided.

EXAMPLES

Next, pneumatic tires according to the present invention (present invention example tires 1 to 5), a conventional pneumatic tire (an exemplary conventional tire), and comparative example tires 1, 2 having different displacement amounts of the side regions were produced as test tires in size of 495/45R22.5 for a heavy duty vehicle. Then, performance of each of the tires was evaluated.

The present invention example tire 1 is a pneumatic tire having the design of the tread surface corresponding to FIG. 1 in which the displacement amount between the side regions in the tire circumferential direction is 0.20 times of the repetition pitch of the pattern of the block L. The present invention example tires 2 to 5 and the comparative example tires 1, 2 have the displacement amounts different from that of the present invention example tire 1.

Figure 9:
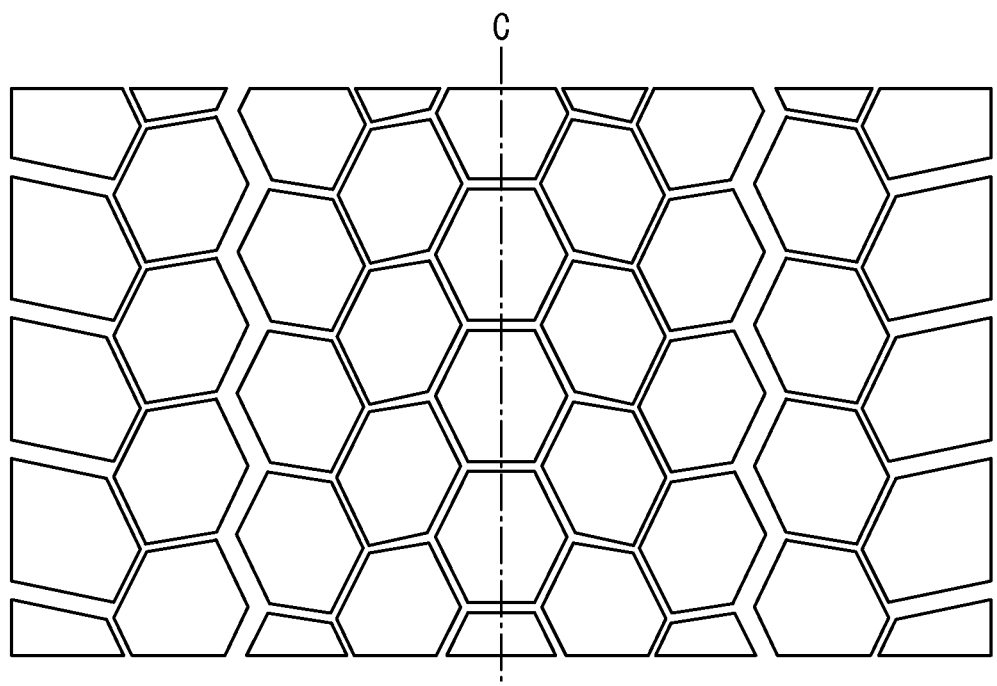
FIG. 9 is a development view of a portion of a tread surface of a conventional example tire.

The exemplary conventional tire is a pneumatic tire having sipes on the tread surface with a design corresponding to FIG. 9.

Each of the present invention example tires 1 to 5, the comparative example tires 1, 2, and the exemplary conventional tire has specifications shown in Table 1.

Each of the test tires was subjected to a pass-by noise test under European pass-by noise test conditions, and thereby the noise was evaluated. For this evaluation method, see Appendix 1 TEST METHOD FOR TYRE-ROAD SOUND LEVELS COAST-BY METHOD of DIRECTIVE 2001/43/EC OF THE EUROPEAN PARLIAMENT AND OF THE COUNCIL of 27 Jun. 2001.

Also, each of the test tires was mounted on a rim in size of 17.00×22.5, and thus a tire wheel was obtained, which was then mounted on a drive wheel of a tractor vehicle used for the test. Next, air pressure of 800 kPa (relative pressure) and a tire load of 57 kN were applied to the test tire, and the tire wheel run for 50000 km on a highway. Then, a wear amount of the center of the polygonal block was measured.

A value of the wear resistance is expressed by an index with respect to a wear amount of the center of block land portion of the exemplary conventional tire set to 100 as reference. The smaller the value is, the better the wear resistance is.

Also, a skilled test driver carried out, in a test course, a running test including a lane change at a speed of 80 km/h, tire travelling limit at the speed of 80 km/h, and acceleration from 50 km/h. Thereby, the steering stability was evaluated. The evaluation is based on how the skilled test driver felt and rated on a scale of 1 to 10.

Further, under conditions of ISO 28580, a rolling resistance test was conducted in conformity with JIS D4234. A value of the wear resistance is expressed by an index with respect to the wear resistance of the exemplary conventional tire set to 100 as reference. The smaller the value is, the better the rolling resistance is.

The above results are shown together in Table 1.

TABLE 1

|  | Present Invention Example Tire 1 | Present Invention Example Tire 2 | Present Invention Example Tire 3 | Present Invention Example Tire 4 | Present Invention Example Tire 5 | Comparative Example Tire 1 | Comparative Example Tire 2 | Exemplary Conventional Tire |
| --- | --- | --- | --- | --- | --- | --- | --- | --- |
| Noise Level (dB) | −0.6 | −2.7 | −1.1 | 0 | −1.2 | 0 | 0.5 | 0.8 |
| Wear Resistance | 100 | 100 | 100 | 100 | 100 | 100 | 100 | 100 |
| Rolling Resistance | 98 | 98 | 98 | 98 | 98 | 98 | 98 | 100 |
| Steering Stability | +2 | +2 | +2 | +2 | +2 | +2 | +2 | +2 |
| Shape of Polygonal Block | Hexagon | Hexagon | Hexagon | Hexagon | Hexagon | Hexagon | Hexagon | Hexagon |
| Length of Polygonal Block in Tire Circumferential Direction (mm) | 60.0 | 60.0 | 60.0 | 60.0 | 60.0 | 60.0 | 60.0 | 60.0 |
| Length of Circumferential End of Polygonal Block in Tire Width Direction (mm) | 30.0 | 30.0 | 30.0 | 30.0 | 30.0 | 30.0 | 30.0 | 30.0 |
| Groove Width $d_1$ of Lateral Groove (mm) | 4.0 | 4.0 | 4.0 | 4.0 | 4.0 | 4.0 | 4.0 | 4.0 |
| Groove Width $d_2$ of Circumferential Narrow Groove (mm) | 1.8 | 1.8 | 1.8 | 1.8 | 1.8 | 1.8 | 1.8 | 1.8 |
| Groove Width $d_3$ of Circumferential Main Groove (mm) | 10.0 | 10.0 | 10.0 | 10.0 | 10.0 | 10.0 | 10.0 | 10.0 |
| Depth of Lateral Groove (mm) | 18.0 | 18.0 | 18.0 | 18.0 | 18.0 | 18.0 | 18.0 | 18.0 |
| Groove Depth of Circumferential Narrow Groove (mm) | 15.0 | 15.0 | 15.0 | 15.0 | 15.0 | 15.0 | 15.0 | 15.0 |
| Groove Depth of Circumferential Main Groove (mm) | 18.0 | 18.0 | 18.0 | 18.0 | 18.0 | 18.0 | 18.0 | 18.0 |
| Displacement Ratio in Tire Circumferential Direction between Side Regions with Respect to 1 Pitch | 0.20 | 0.28 | 0.32 | 0.40 | 0.24 | 0.17 | 0.45 | 0 |
| Presence of Sipe | Yes | Yes | Yes | Yes | Yes | Yes | Yes | Yes |
| Crank-shaped Sipe | Yes | Yes | Yes | Yes | Yes | Yes | Yes | Yes |

As is apparent from the results in Table 1, it was confirmed that, since the present invention example tires 1 to 5 have the side regions displaced from each other by 0.2 to 0.4 times of the repetition pitch of the pattern of the block row, the noise may be significantly reduced as compared with any one of the exemplary conventional tire and the comparative example tires 1, 2.

REFERENCE SIGNS LIST 1 tread surface
2 circumferential main groove
3 circumferential narrow groove
4 lateral groove
5 polygonal block
6 tire circumferential end of polygonal block
7 center of polygonal block
8 kick-out end of polygonal block
9 kick-in end of polygonal block
10 sipe
11 sipe width midpoint
12 tire width direction outermost inflection point of sipe
C tire equator
L block row
$d_1$ groove width of lateral groove
$d_2$ groove width of circumferential narrow groove
$d_3$ groove width of circumferential main groove
$R_1$, $R_2$ side region

The invention claimed is:

1. A pneumatic tire having, on a tread surface, a land portion defined by a pair of circumferential main grooves extending in a zig-zag manner along a tire equator on either side thereof, the land portion being divided, by at least four circumferential narrow grooves extending in the zig-zag manner along the tire equator and multiple lateral grooves communicating between the circumferential main groove and the circumferential narrow groove or between the circumferential narrow grooves, into at least five block rows each of which including polygonal blocks with at least five corners arranged in a tire circumferential direction, wherein
a block arrangement having the polygonal blocks arranged in a line-symmetric manner with respect to the tire equator as an axis of symmetry includes side regions facing each other across the tire equator and displaced from each other in the tire circumferential direction by a phase difference of 0.2 to 0.4 times of a repetition pitch of a pattern of the block row, wherein
any one of the block rows is located across the tire equator, and wherein
the polygonal blocks constituting the block row located across the tire equator, according to a phase difference between the side regions facing each other across the tire equator, have a shape stretched in the circumferential direction.

2. The pneumatic tire according to claim 1, wherein the block arrangement includes the side regions displaced from each other in the tire circumferential direction by 0.24 to 0.32 times of the repetition pitch of the pattern of the block row.

3. The pneumatic tire according to claim 1, wherein the polygonal blocks constituting each of the block rows adjacent to one another in a tire width direction across the tire circumferential narrow groove are displaced from one another in the tire circumferential direction.

4. The pneumatic tire according to claim 1, wherein a groove width of the circumferential narrow groove is smaller than a groove width of the lateral groove.

5. The pneumatic tire according to claim 4, wherein the groove width of the circumferential narrow groove is 0.5 to 3.0 mm.

6. The pneumatic tire according to claim 1, wherein length of the polygonal block in the tire width direction increases from either tire circumferential end of the polygonal block to a center of the polygonal block.

7. The pneumatic tire according to claim 1, wherein the polygonal block is provided with a sipe communicating between circumferential grooves adjacent to the polygonal block in the tire width direction.

8. The pneumatic tire according to claim 7, wherein the sipe is formed in a crank shape extending in the tire width direction.

9. The pneumatic tire according to claim 1, wherein the polygonal block is hexagonal.

\* \* \* \* \*